(12) United States Patent
Chayat

(10) Patent No.: US 7,930,341 B1
(45) Date of Patent: Apr. 19, 2011

(54) EXTENDED FLOW-CONTROL FOR LONG-DISTANCE LINKS

(75) Inventor: Ronen Chayat, Haifa (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 2716 days.

(21) Appl. No.: 10/140,730

(22) Filed: May 7, 2002

Related U.S. Application Data

(60) Provisional application No. 60/344,739, filed on Dec. 26, 2001.

(51) Int. Cl.
*G06F 15/16* (2006.01)
(52) U.S. Cl. ........................ 709/203; 709/217
(58) Field of Classification Search .............. 710/52–57, 710/29, 60; 709/203, 217
See application file for complete search history.

(56) References Cited

U.S. PATENT DOCUMENTS

| | | | | |
|---|---|---|---|---|
| 5,771,356 A * | 6/1998 | Leger et al. | ...................... | 710/52 |
| 5,862,409 A * | 1/1999 | Yoshimoto et al. | ............. | 710/57 |
| 5,892,979 A * | 4/1999 | Shiraki et al. | .................... | 710/52 |
| 5,941,962 A * | 8/1999 | Hirano | ............................. | 710/53 |
| 6,031,821 A * | 2/2000 | Kalkunte et al. | ............. | 370/235 |
| 6,035,333 A * | 3/2000 | Jeffries et al. | ................. | 709/224 |
| 6,148,381 A * | 11/2000 | Jotwani | ......................... | 711/158 |
| 6,167,029 A * | 12/2000 | Ramakrishnan | .............. | 709/235 |
| 6,338,090 B1 * | 1/2002 | Emmes et al. | ................. | 710/55 |
| 6,529,521 B1 * | 3/2003 | MacArthur | .................... | 370/463 |
| 6,567,413 B1 * | 5/2003 | Denton et al. | ................ | 370/401 |
| 6,618,357 B1 * | 9/2003 | Geyer et al. | .................... | 370/236 |
| 6,633,585 B1 * | 10/2003 | Ghanwani et al. | ............ | 370/468 |
| 6,754,179 B1 * | 6/2004 | Lin | ................................ | 370/235 |
| 6,868,461 B1 * | 3/2005 | Mirkhani et al. | ............... | 710/56 |
| 6,912,603 B2 * | 6/2005 | Kanazashi | ...................... | 710/29 |

OTHER PUBLICATIONS

"System Packet Interface Level 4 (SPI-4) Phase 2: OC-192 System Interface for Physical and Link Layer Devices," Jan. 2001, Optical Internetworking Forum, pp. 1-63.

* cited by examiner

*Primary Examiner* — Ramsey Refai

(57) ABSTRACT

A method, apparatus, and computer-readable media comprise storing in a first buffer data received from a network device; sending the data from the first buffer to a second buffer in response to status signals asserted by the second buffer, wherein the second buffer stores the data, and wherein the status signals asserted by the second buffer indicate an amount of the data in the second buffer; and sending flow-control signals to the network device based on the status signals asserted by the second buffer, thereby causing the network device to regulate the amount of the data sent from the network device in response to the flow-control signals.

130 Claims, 5 Drawing Sheets

EXTENDED FLOW-CONTROL FOR LONG-DISTANCE LINKS

CROSS-REFERENCE TO RELATED APPLICATIONS

This application claims the benefit of U.S. Provisional Patent Application Ser. No. 60/344,739, "Extended Flow Control For Long-Distance Links," by Ronen Chayat, filed Dec. 26, 2001.

BACKGROUND

The present invention relates generally to data communications, and particularly to techniques for implementing data flow control schemes in long-distance data communication links.

In conventional flow-control schemes, a device such as a media access controller (MAC) receives data from a link partner, and stores the data in a buffer. The MAC sends the data from its buffer to other devices, such as a link-layer device (LLD), based on status signals generated by the LLD indicating the LLD's readiness to accept the data. When data arrives at the MAC faster than the MAC can send data to the LLD, the amount of data stored in the MAC's buffer grows. To prevent the data from overflowing its buffer, the MAC sends flow control signals to its link partner based on the level of data in the MAC's buffer.

The usability of this scheme depends on the size of the MAC's buffer and the distance of the link. This scheme works well for short-distance links (usually on the order of hundreds or several thousands of meters), but is unsuitable for long-distance links (on the order of tens of kilometers and more) for the following reason. Long-distance links have much greater latency (that is, the time required for a signal to traverse the link) that short-distance links. In the time required for a pause signal sent by the MAC to reach its link partner, the amount of residual data (that is, the amount of data sent by the link partner after the MAC sent the flow control signal) can be very large. In such a scenario, a MAC serving 80 km fiber links requires approximately 1.15 megabits of buffer memory for each link.

One conventional approach to this problem is to simply provide enough buffer memory in the MAC to accommodate the worst-case scenario, where the link partner receives a pause signal from the MAC just after initiating transmission of a jumbo frame to the MAC. The amount of residual data is then the sum of the data in the jumbo frame and the data then traversing the long-distance link. One disadvantage to this approach is the substantial cost of incorporating such a large amount of memory into the MAC, which is generally implemented as an integrated circuit. Another disadvantage is that such a MAC, while perhaps suitable for long-distance links, is too expensive for use in short-distance links. Therefore a network designer would require two different MACS: one with a large amount of memory to accommodate long-distance links, and a less-expensive one with a small amount of memory for short-distance links.

Another approach is referred to as "SideBand Flow Control" (SBFC), which requires the use of an additional control channel between the MAC and LLD. The LLD uses the SBFC channel to force the MAC to send flow control signals to its link partner. One disadvantage of this approach is that it requires a modification to the interface between the MAC and the LLD.

SUMMARY

Implementations of the present invention provide lossless flow control over long-distance links using only the amount of memory necessary for flow control over short-distance links. The maximum link distance supported is independent of the memory size. Thus these implementations are inexpensive, and are equally suitable for short-distance and long-distance links. In addition, these implementations employ standard signaling between the MAC and the LLD, thus requiring no modification to the LLD or the interface between the MAC and the LLD.

In general, in one aspect, the invention features a network device that comprises a media access controller comprising a first buffer to store data received from a further network device, and a transmitter to transmit the data from the first buffer; and a link-layer device to receive the data transmitted by the media access controller, the link-layer device comprising a second buffer to store the data received from the media access controller; wherein the link-layer device asserts status signals indicating an amount of the data in the second buffer; wherein the transmitter transmits the data from the first buffer to the link-layer device in response to the status signals asserted by the link-layer device; and wherein the media access controller further comprises a controller to send flow-control signals to the further network device based on the status signals asserted by the link-layer device, thereby causing the further network device to regulate the amount of the data sent from the further network device to the network device in response to the flow-control signals.

Particular implementations can include one or more of the following features. The controller sends the flow-control signals to the further network device based on the status signals asserted by the link-layer device and an amount of the data in the first buffer. The controller sends a pause flow-control signal to the further network device when the status signals asserted by the link-layer device indicate that the amount of the data in the second buffer is greater than a first predetermined threshold, thereby causing the further network device to stop sending the data to the network device. The controller sends a pause flow-control signal to the further network device when the amount of the data in the first buffer is greater than, or equal to, a second predetermined threshold, thereby causing the further network device to stop sending the data to the network device. The controller sends a resume flow-control signal when the amount of the data in the first buffer is less than a third predetermined threshold and the status signals asserted by the link-layer device indicate that the amount of the data in the second buffer is less than the first predetermined threshold, thereby causing the further network device to resume sending the data to the network device. The transmitter stops sending the data to the link-layer device when the status signals asserted by the link-layer device indicate that the amount of the data in the second buffer is greater than a fourth predetermined threshold. The first predetermined threshold is less than the fourth predetermined threshold. The transmitter, after stopping sending the data to the link-layer device, starts sending the data to the link-layer device when the status signals asserted by the link-layer device indicate that the amount of the data in the second buffer is less than the fourth predetermined threshold. The transmitter, after starting sending the data to the link-layer device, stops sending the data to the link-layer device when the status signals asserted by the link-layer device indicate that the amount of the data in the second buffer is greater than the fourth predetermined threshold. The first and fourth predetermined thresholds are the same. The transmitter, after stopping sending the data to the link-layer device, starts sending the data to the link-layer device when the amount of the data in the first buffer is greater than, or equal to, the second predetermined threshold and the status signals asserted by the link-layer device indicate that the amount of the data in the second buffer is less than the first predetermined threshold. The transmitter, after starting sending the data to the link-layer device, stops sending the data to the link-layer device when the status signals asserted by the link-layer device indicate that the amount of the data in the second buffer is greater than the first predetermined threshold. The status signals asserted by the link-layer device conform to the SPI-4.2 standard.

In general, in one aspect, the invention features a method, apparatus, and computer-readable media that comprise storing in a first buffer data received from a network device; sending the data from the first buffer to a second buffer in response to status signals asserted by the second buffer, wherein the second buffer stores the data, and wherein the status signals asserted by the second buffer indicate an amount of the data in the second buffer; and sending flow-control signals to the network device based on the status signals asserted by the second buffer, thereby causing the network device to regulate the amount of the data sent from the network device in response to the flow-control signals.

Particular implementations can include one or more of the following features. Sending the flow-control signals to the network device comprises sending the flow-control signals to the network device based on the status signals asserted by the second buffer and an amount of the data in the first buffer. Sending the flow-control signals to the network device comprises sending a pause flow-control signal to the network device when the status signals asserted by the second buffer indicate that the amount of the data in the second buffer is greater than a first predetermined threshold, thereby causing the network device to stop sending the data. Sending the flow-control signals to the network device comprises sending a pause flow-control signal to the network device when the amount of the data in the first buffer is greater than, or equal to, a second predetermined threshold, thereby causing the network device to stop sending the data. Sending the flow-control signals to the network device comprises sending a resume flow-control signal when the amount of the data in the first buffer is less than a third predetermined threshold and the status signals asserted by the second buffer indicate that the amount of the data in the second buffer is less than the first predetermined threshold, thereby causing the network device to resume sending the data. Implementations can comprise stopping sending the data to the second buffer when the status signals asserted by the second buffer indicate that the amount of the data in the second buffer is greater than a fourth predetermined threshold. The first predetermined threshold is less than the fourth predetermined threshold. Implementations can comprise, after stopping sending the data to the second buffer, starting sending the data to the second buffer when the status signals asserted by the second buffer indicate that the amount of the data in the second buffer is less than the fourth predetermined threshold. Implementations can comprise, after starting sending the data to the second buffer, stopping sending the data to the second buffer when the status signals asserted by the second buffer indicate that the amount of the data in the second buffer is greater than the fourth predetermined threshold. The first and fourth predetermined thresholds are the same. Implementations can comprise, after stopping sending the data to the second buffer, starting sending the data to the second buffer when the amount of the data in the first buffer is greater than, or equal to, the second predetermined threshold and the status signals asserted by the second buffer indicate that the amount of the data in the second buffer is less than the first predetermined threshold. Implementations can comprise, after starting sending the data to the second buffer, stopping sending the data to the second buffer when the status signals asserted by the second buffer indicate that the amount of the data in the second buffer is greater than the first predetermined threshold. The status signals asserted by the second buffer conform to the SPI-4.2 standard.

In general, in one aspect, the invention features an network comprising a first network device to transmit data; and a second network device to receive the data, the second network device comprising a media access controller comprising a first buffer to store the data received from the first network device, and a transmitter to transmit the data from the first buffer, and a link-layer device to receive the data transmitted by the media access controller, the link-layer device comprising a second buffer to store the data received from the media access controller; wherein the link-layer device asserts status signals indicating an amount of the data in the second buffer; wherein the transmitter transmits the data from the first buffer to the link-layer device in response to the status signals asserted by the link-layer device; and wherein the media access controller further comprises a controller to send flow-control signals to the first network device based on the status signals asserted by the link-layer device, thereby causing the first network device to regulate the amount of the data sent from the first network device to the second network device in response to the flow-control signals.

Particular implementations can include one or more of the following features. The controller sends the flow-control signals to the further network device based on the status signals asserted by the link-layer device and an amount of the data in the first buffer. The controller sends a pause flow-control signal to the further network device when the status signals asserted by the link-layer device indicate that the amount of the data in the second buffer is greater than a first predetermined threshold, thereby causing the further network device to stop sending the data to the network device. The controller sends a pause flow-control signal to the further network device when the amount of the data in the first buffer is greater than, or equal to, a second predetermined threshold, thereby causing the further network device to stop sending the data to the network device. The controller sends a resume flow-control signal when the amount of the data in the first buffer is less than a third predetermined threshold and the status signals asserted by the link-layer device indicate that the amount of the data in the second buffer is less than the first predetermined threshold, thereby causing the further network device to resume sending the data to the network device. The transmitter stops sending the data to the link-layer device when the status signals asserted by the link-layer device indicate that the amount of the data in the second buffer is greater than a fourth predetermined threshold. The first predetermined threshold is less than the fourth predetermined threshold. The transmitter, after stopping sending the data to the link-layer device, starts sending the data to the link-layer device when the status signals asserted by the link-layer device indicate that the amount of the data in the second buffer is less than the fourth predetermined threshold. The transmitter, after starting sending the data to the link-layer device, stops sending the data to the link-layer device when the status signals asserted by the link-layer device indicate that the amount of the data in the second buffer is greater than the fourth predetermined threshold. The first and fourth predetermined thresholds are the same. The transmitter, after stopping sending the data to the link-layer device, starts sending the data to the link-layer device when the amount of the data in the first buffer is greater than, or equal to, the second predetermined threshold and the status signals asserted by the link-layer device indicate that the amount of the data in the second buffer is less than the first predetermined threshold. The transmitter, after starting sending the data to the link-layer device, stops sending the data to the link-layer device when the status signals asserted by the link-layer device indicate that the amount of the data in the second buffer is greater than the first predetermined threshold. The status signals asserted by the link-layer device conform to the SPI-4.2 standard.

In general, in one aspect, the invention features a method, apparatus, and computer-readable media comprising transmitting data from a first network device; receiving the data at a second network device; storing the data in a first buffer in the second network device; sending the data from the first buffer to a second buffer in the second network device in response to status signals asserted by the second buffer, wherein the second buffer stores the data, and wherein the status signals asserted by the second buffer indicate an amount of the data in the second buffer; and sending flow-control signals to the first network device based on the status signals asserted by the second buffer, thereby causing the first network device to regulate the amount of the data sent from the first network device to the second network device in response to the flow-control signals.

Particular implementations can include one or more of the following features. Sending the flow-control signals to the first network device comprises sending the flow-control signals to the first network device based on the status signals asserted by the second buffer and an amount of the data in the first buffer. Sending the flow-control signals to the first network device comprises sending a pause flow-control signal to the first network device when the status signals asserted by the second buffer indicate that the amount of the data in the second buffer is greater than a first predetermined threshold, thereby causing the first network device to stop sending the data. Sending the flow-control signals to the first network device comprises sending a pause flow-control signal to the first network device when the amount of the data in the first buffer is greater than, or equal to, a second predetermined threshold, thereby causing the first network device to stop sending the data. Sending the flow-control signals to the first network device comprises sending a resume flow-control signal when the amount of the data in the first buffer is less than a third predetermined threshold and the status signals asserted by the second buffer indicate that the amount of the data in the second buffer is less than the first predetermined threshold, thereby causing the first network device to resume sending the data. Implementations can comprise stopping sending the data to the second buffer when the status signals asserted by the second buffer indicate that the amount of the data in the second buffer is greater than a fourth predetermined threshold. The first predetermined threshold is less than the fourth predetermined threshold. Implementations can comprise, after stopping sending the data to the second buffer, starting sending the data to the second buffer when the status signals asserted by the second buffer indicate that the amount of the data in the second buffer is less than the fourth predetermined threshold. Implementations can comprise, after starting sending the data to the second buffer, stopping sending the data to the second buffer when the status signals asserted by the second buffer indicate that the amount of the data in the second buffer is greater than the fourth predetermined threshold. The first and fourth predetermined thresholds are the same. Implementations can comprise, after stopping sending the data to the second buffer, starting sending the data to the second buffer when the amount of the data in the first buffer is greater than, or equal to, the second predetermined threshold and the status signals asserted by the second buffer indicate that the amount of the data in the second buffer is less than the first predetermined threshold. Implementations can comprise, after starting sending the data to the second buffer, stopping sending the data to the second buffer when the status signals asserted by the second buffer indicate that the amount of the data in the second buffer is greater than the first predetermined threshold. The status signals asserted by the second buffer conform to the SPI-4.2 standard.

In general, in one aspect, the invention features an apparatus for communicating data from a first communication device to a second communication device. It comprises a first buffer to store the data received from the first communication device; a transmitter to send the data from the first buffer to the second communication device in response to status signals asserted by the second communication device, wherein the second communication device stores the data in a second buffer, and wherein the status signals asserted by the second communication device indicate an amount of the data in the second buffer; and a controller to send flow-control signals to the first communication device based on the status signals asserted by the second communication device, thereby causing the first communication device to regulate the amount of the data sent from the first communication device to the second communication device in response to the flow-control signals.

Particular implementations can include one or more of the following features. The controller sends the flow-control signals to the first communication device based on the status signals asserted by the second communication device and an amount of the data in the first buffer. The controller sends a pause flow-control signal to the first communication device when the status signals asserted by the second communication device indicate that the amount of the data in the second buffer is greater than a first predetermined threshold, thereby causing the first communication device to stop sending the data to the second communication device. The controller sends a pause flow-control signal to the first communication device when the amount of the data in the first buffer is greater than, or equal to, a second predetermined threshold, thereby causing the first communication device to stop sending the data to the second communication device. The controller sends a resume flow-control signal when the amount of the data in the first buffer is less than a third predetermined threshold and the status signals asserted by the second communication device indicate that the amount of the data in the second buffer is less than the first predetermined threshold, thereby causing the first communication device to resume sending the data to the second communication device. The transmitter stops sending the data to the second communication device when the status signals asserted by the second communication device indicate that the amount of the data in the second buffer is greater than a fourth predetermined threshold. The first predetermined threshold is less than the fourth predetermined threshold. The transmitter, after stopping sending the data to the second communication device, starts sending the data to the second communication device when the status signals asserted by the second communication device indicate that the amount of the data in the second buffer is less than the fourth predetermined threshold. The transmitter, after starting sending the data to the second communication device, stops sending the data to the second communication device when the status signals asserted by the second communication device indicate that the amount of the data in the second buffer is greater than the fourth predetermined threshold. The first and fourth predetermined thresholds are the same. The transmitter, after stopping sending the data to the second communication device, starts sending the data to the second communication device when the amount of the data in the first buffer is greater than, or equal to, the second predetermined threshold and the status signals asserted by the second communication device indicate that the amount of the data in the second buffer is less than the first predetermined threshold. The transmitter, after starting sending the data to the second communication device, stops sending the data to the second communication device when the status signals asserted by the second communication device indicate that the amount of the data in the second buffer is greater than the first predetermined threshold. The status signals asserted by the second communication device conform to the SPI-4.2 standard.

In general, in one aspect, the invention features a method, apparatus, and computer-readable media for communicating data from a first communication device to a second communication device. It comprises storing in a third communication device the data received from the first communication device; sending the data from the third communication device to the second communication device in response to status signals asserted by the second communication device, wherein the second communication device stores the data in a buffer, and wherein the status signals asserted by the second communication device indicate an amount of the data in the buffer; and sending flow-control signals to the first communication device based on the status signals asserted by the second communication device, thereby causing the first communication device to regulate the amount of the data sent from the first communication device to the second communication device in response to the flow-control signals.

Particular implementations can include one or more of the following features. Sending the flow-control signals to the first communication device comprises sending the flow-control signals to the first communication device based on the status signals asserted by the second communication device and an amount of the data in the third communication device. Sending the flow-control signals to the first communication device comprises sending a pause flow-control signal to the first communication device when the status signals asserted by the second communication device indicate that the amount of the data in the buffer is greater than a first predetermined threshold, thereby causing the first communication device to stop sending the data to the second communication device. Sending the flow-control signals to the first communication device comprises sending a pause flow-control signal to the first communication device when the amount of the data in the third communication device is greater than, or equal to, a second predetermined threshold, thereby causing the first communication device to stop sending the data to the second communication device. Sending the flow-control signals to the first communication device comprises sending a resume flow-control signal when the amount of the data in the third communication device is less than a third predetermined threshold and the status signals asserted by the second communication device indicate that the amount of the data in the buffer is less than the first predetermined threshold, thereby causing the first communication device to resume sending the data to the second communication device. Implementations can comprise stopping sending the data to the second communication device when the status signals asserted by the second communication device indicate that the amount of the data in the buffer is greater than a fourth predetermined threshold. The first predetermined threshold is less than the fourth predetermined threshold. Implementations can comprise, after stopping sending the data to the second communication device, starting sending the data to the second communication device when the status signals asserted by the second communication device indicate that the amount of the data in the buffer is less than the fourth predetermined threshold. Implementations can comprise, after starting sending the data to the second communication device, stopping sending the data to the second communication device when the status signals asserted by the second communication device indicate that the amount of the data in the buffer is greater than the fourth predetermined threshold. The first and fourth predetermined thresholds are the same. Implementations can comprise, after stopping sending the data to the second communication device, starting sending the data to the second communication device when the amount of the data in the third communication device is greater than, or equal to, the second predetermined threshold and the status signals asserted by the second communication device indicate that the amount of the data in the buffer is less than the first predetermined threshold. Implementations can comprise, after starting sending the data to the second communication device, stopping sending the data to the second communication device when the status signals asserted by the second communication device indicate that the amount of the data in the buffer is greater than the first predetermined threshold. The status signals asserted by the second communication device conform to the SPI-4.2 standard.

The details of one or more implementations are set forth in the accompanying drawings and the description below. Other features will be apparent from the description and drawings, and from the claims.

Figure 1:
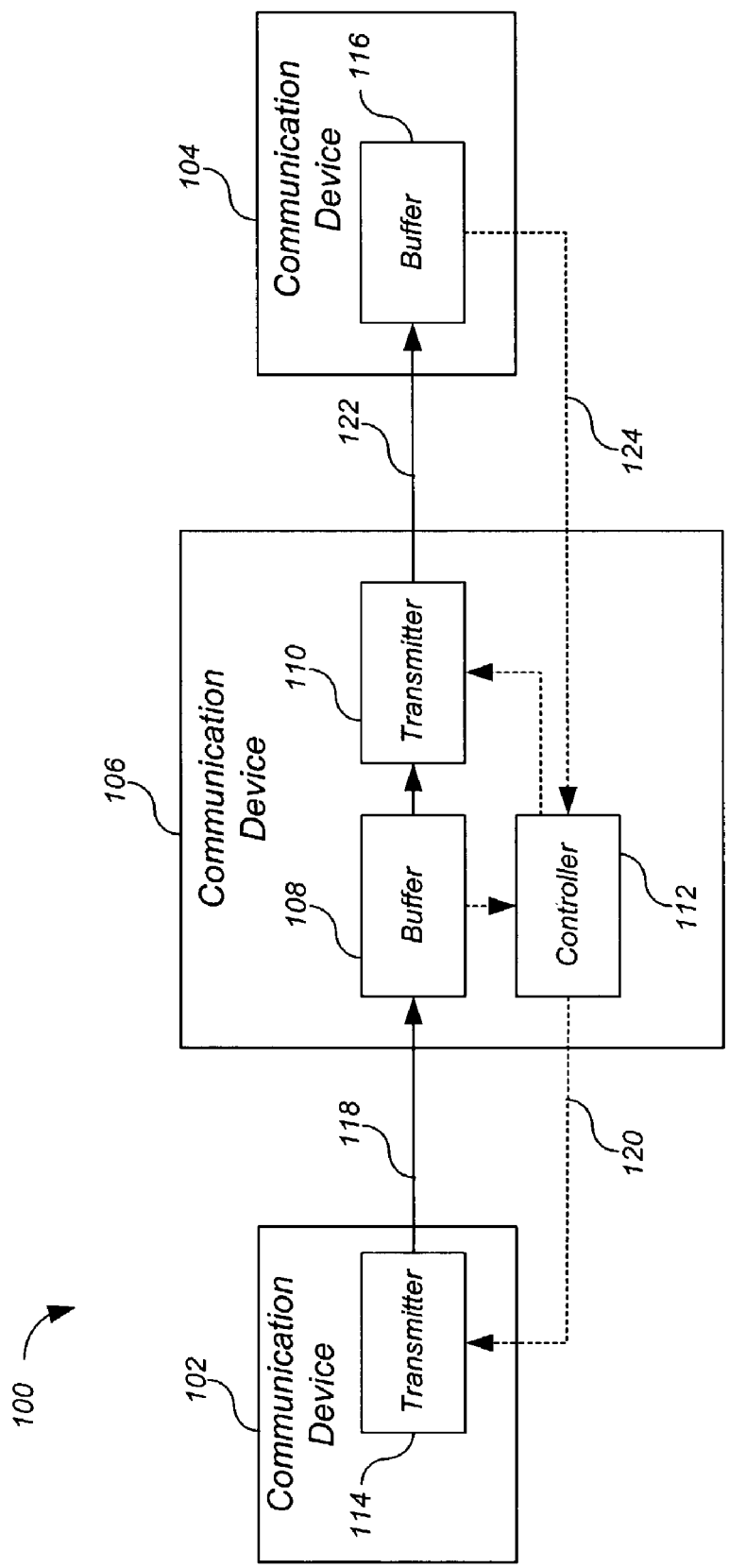
FIG. 1 shows a data communication system according to one implementation.

The leading digit(s) of each reference numeral used in this specification indicates the number of the drawing in which the reference numeral first appears.

DETAILED DESCRIPTION

FIG. 1 shows a data communication system 100 according to one implementation. Data communication system 100 includes three communication devices 102, 104 and 106, which can be any devices capable of communicating data over a data channel. Communication device 102 includes a transmitter 114 that sends data to communication device 106 over a data channel 118 based on control signals such as flow-control signals received from communication device 106 over a control channel 120. For example, when communication device 106 asserts a "pause" control signal on channel 120, communication device 102 stops sending data, and when communication device 106 asserts a "resume" control signal on channel 120, communication device 102 resumes sending data. Communication device 104 receives data from communication device 106 over a data channel 122, stores the data in a buffer 116, and provides over a control channel 124 status signals indicating the amount of data stored in buffer 116. Data in buffer 116 drains to a further device (not shown).

Communication device 106 includes a buffer 108 that stores the data received from communication device 102 and a transmitter 110 that sends the data to communication device 104 based on the status signals received from communication device 104. For example, when the amount of data in buffer 116 falls below a predetermined fullness threshold, communication device 104 asserts a "low data" status signal. In response, transmitter 110 begins to send data to communication device 104. When the amount of data in buffer 116 rises above the fullness threshold, communication device 104 disasserts the "low data" status signal, and asserts a "high data" status signal. In response, transmitter 110 stops sending data to communication device 104 until the "low data" status signal is again asserted.

In other implementations, network device 104 asserts the status signals periodically; each status signal when asserted then reflects the current state of buffer 116. Further status signals, multiple thresholds, and multiple data rates can be used to optimize data flow from communication device 106 to communication device 104. Such techniques are described in detail below.

Communication device 106 also includes a controller 112 that detects the amount of data stored in buffer 108 and provides the control signals to communication device 102 based on the status signals from communication device 104 and the amount of data stored in buffer 108. The amount of data in buffer 108 can be determined with reference to a predetermined threshold T. In one implementation, buffer 116 is much larger than buffer 108. Therefore the thresholds for buffers 108 and 116 are selected to prevent overruns of buffer 108.

Figure 2:
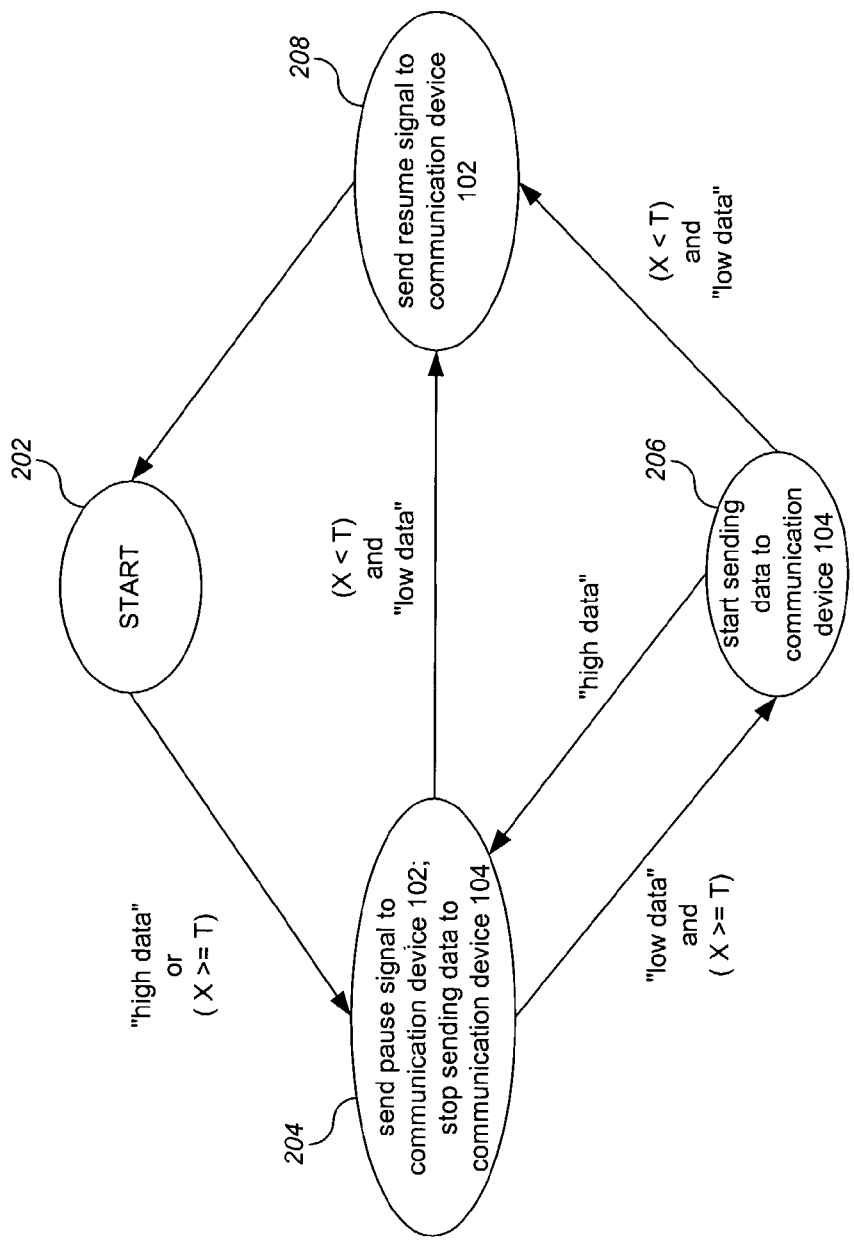
FIG. 2 shows a state diagram for the communication device of FIG. 1 according to an implementation that uses two status signals: "low data" and "high data".

FIG. 2 shows a state diagram for communication device 106 of FIG. 1 according to an implementation that uses two status signals: "low data" and "high data". Communication device 104 sends the status signals periodically to communication device 106. In this implementation, communication device 104 asserts a "low data" status signal when the amount of data stored in buffer 116 is less than a predetermined fullness threshold, and asserts a "high data" status signal when the amount of data stored in buffer 116 is equal to or above the fullness threshold.

When communication device 106 receives a "low data" status signal from communication device 104, communication device 106 sends data to communication device 104. When communication device 106 receives a "high data" status signal from communication device 104, communication device 106 sends no data to communication device 104.

In one such implementation, buffer 108 has a predetermined threshold T for the amount of data stored therein. Implementations using more or fewer thresholds will be apparent to one skilled in the relevant arts after reading this description. According to this implementation, communication system 100 has four states 202, 204, 206 and 208.

Communication device 106 begins in a "START" state 202 on waking up (that is, after receiving power, being reset, or the like). In state 202, communication device 106 takes no action. Either of two conditions causes communication device 106 to transition to state 204: communication device 106 receives a "high data" status signal from communication device 104, or the amount X of data in buffer 108 is equal to or greater than threshold T (X>=T).

In state 204, communication device 106 stops sending data to communication device 104, and sends a "pause" control signal to communication device 102, thereby causing communication device 102 to cease sending data to communication device 106. In one implementation, communication device 106 sends a pause control signal by sending one or more Ethernet PAUSE frames. If in state 204 communication device 106 receives further "high data" status signals from communication device 104, communication device 106 remains in state 204.

If buffer 116 drains so rapidly that the amount of data in buffer 116 falls below the fullness threshold, communication device 104 asserts a "low data" status signal. If the amount of data X in buffer 108 is greater than, or equal to, threshold T (X>=T) when communication device 106 receives a "low data" status signal from communication device 104, communication device 106 transitions to state 206. However, if the amount of data X in buffer 108 is less than threshold T (X<T) when communication device 106 receives a "low data" status signal from communication device 104, communication device 106 transitions to state 208, described in detail below.

In state 206, communication device 106 begins sending data to communication device 104. Communication device 104 stores the data in buffer 116. If the level of data in buffer 116 exceeds the fullness threshold, communication device 104 asserts a "high data" status signal. When in state 206 communication device 106 receives a "high data" status signal, communication device 106 transitions to state 204.

Otherwise communication device 106 remains in state 206 as long as the amount of data in buffer 108 remains greater than, or equal to, threshold T. However, if in state 206 buffer 108 drains so rapidly that the amount of data in buffer 108 falls below the threshold T (X<T) and communication device subsequently receives a further "low data" signal, communication device 106 transitions to state 208.

In state 208, communication device 106 sends a "resume" control signal to communication device 102, thereby permitting communication device 102 to resume sending data to communication device 106. In one implementation, communication device 106 sends a resume control signal by sending an Ethernet PAUSE frame with a timer value of zero. When state 208 is immediately preceded by state 204, communication device 106 begins sending data to communication device 104. When state 208 is immediately preceded by state 206, communication device 106 continues sending data to communication device 104. Communication device 106 then transitions to start state 202.

From this description of the state diagram of FIG. 2, it will be apparent that the control signals asserted by communication device 106 are based not only upon the amount of data stored in buffer 108, but also upon the amount of data stored in communication device 104. In this way communication device 106 effectively "borrows" memory from communication device 104, thus making the effective size of buffer 108 the sum of the size of the entire buffer 108 and the size of buffer 116 above the fullness threshold. Thus the amount of memory in communication device 106 can be reduced compared to conventional devices where the control signals are based solely upon the amount of data in buffer 108. The techniques disclosed herein are thus suitable for long-distance links, and inexpensive enough for use in short-distance links.

Figure 3:
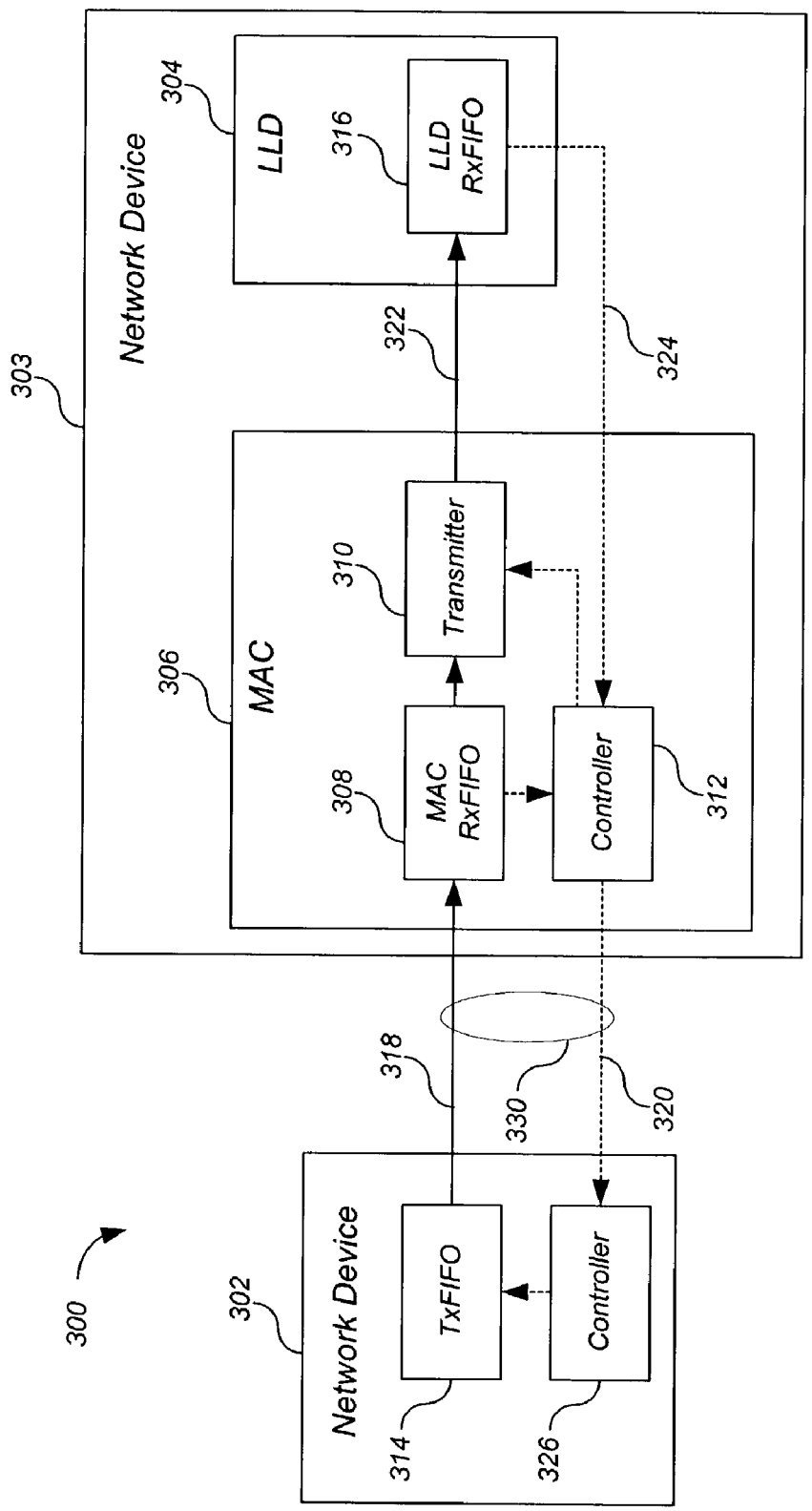
FIG. 3 shows a communication system according to another implementation.

FIG. 3 shows a communication system 300 according to another implementation. Communication system 300 includes two network devices 302 and 303 that communicate as link partners over a link 330 that includes a data channel 318 for transporting data from network device 302 to network device 303, and a control channel for transporting controls signals from network device 303 to network device 302.

Network device 302 includes a transmit first-in-first-out (FIFO) buffer (TxFIFO) 314 and a controller 326 that causes TxFIFO 314 to send data over channel 318 based on control signals received from network device 303 over channel 320.

Network device 303 includes a MAC 306 and a link-layer device (LLD) 304. LLD 304 includes a FIFO buffer (LLD RxFIFO) 316 that stores data received from MAC 306 over a channel 322 and sends status signals indicating the amount of data stored in LLD RxFIFO 316 to MAC 306 over a control channel 324. Data in LLD RxFIFO 316 drains to a further device (not shown).

MAC 306 includes a FIFO buffer (MAC RxFIFO) 308 that stores data received over channel 318 from network device 302 and a transmitter 310 that sends data from MAC RxFIFO 308 to LLD 304 over channel 322 based on the status signals sent from LLD 304 over channel 324. MAC 306 also includes a controller 312 that detects the amount of data stored in MAC RxFIFO 308 and sends the control signals to network device 302 based on the status signals received from LLD 304 and the amount of data stored in MAC RxFIFO 308.

In one implementation, communication system 300 employs the status signaling convention specified in a document entitled "System Packet Interface Level 4 (SPI-4) Phase 2: OC-192 System Interface for Physical and Link Layer Devices" (referred to hereinafter as SPI-4.2) available from The Optical Internetworking Forum, 39355 California Street, Suite 307, Fremont, Calif. 94538. According to SPI-4.2, LLD 304 periodically generates a two-bit status signal that conveys one of three possible status signals ("satisfied", "hungry" and "starving") by comparing the amount of data stored in LLD RxFIFO 316 to two thresholds ("almost empty" and "almost full"). The status signal "satisfied" indicates that the amount of data in the LLD RxFIFO is above the "almost full" threshold. The status signal "starving" indicates that the amount of data in LLD RxFIFO 316 is below the "almost empty" threshold. The status signal "hungry" indicates that the amount of data in LLD RxFIFO 316 is neither above the "almost full" threshold nor below the "almost empty" threshold.

SPI-4.2 also permits the use of only two status signals by ignoring one of the bits of the two-bit status signal. MAC 306 receives a "cannot accept data" status signal when the amount of data in LLD RxFIFO 316 is above the "almost full" threshold, and receives a "can accept data" status signal otherwise.

Figure 4:
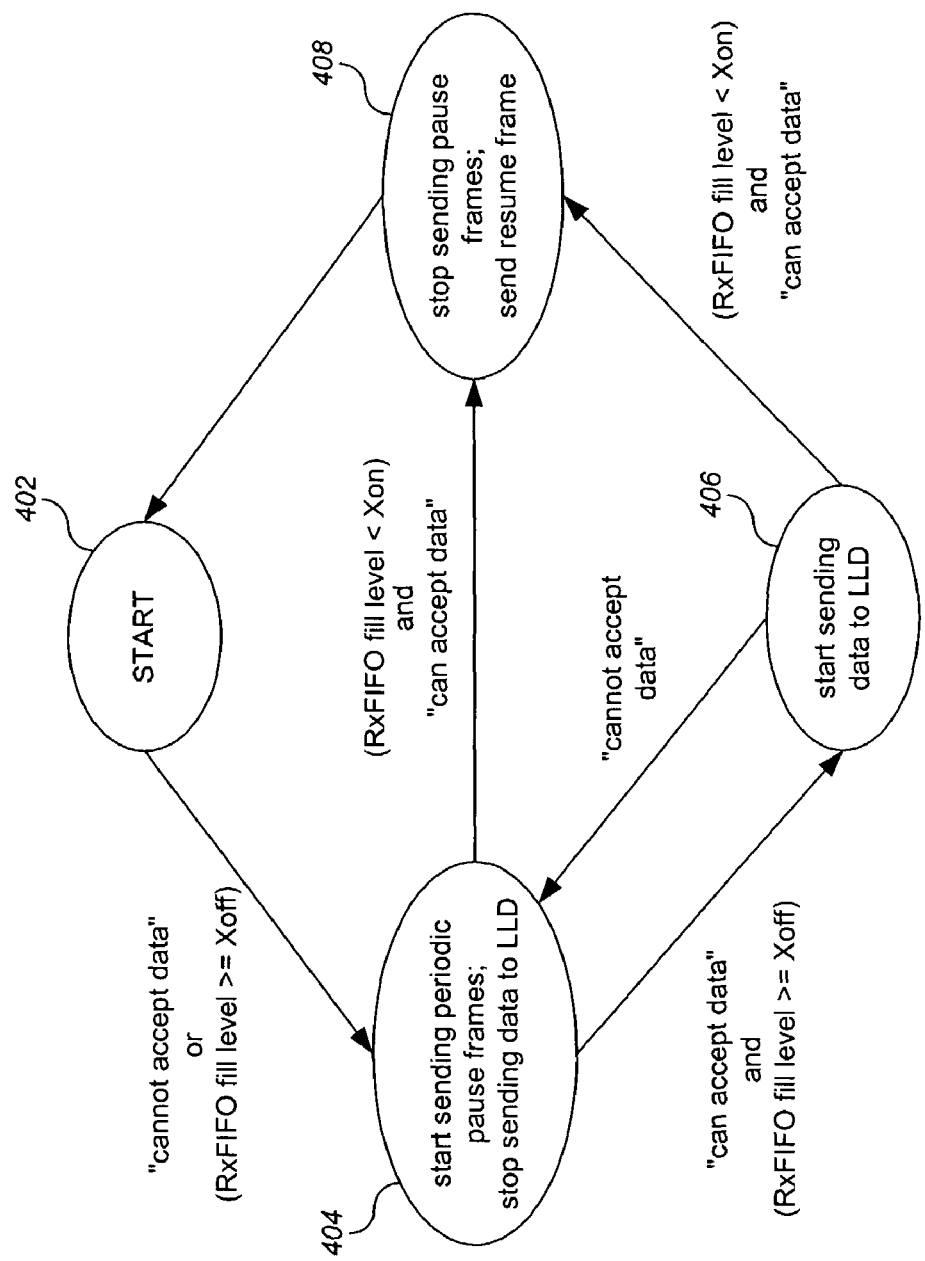
FIG. 4 shows a state diagram for FIG. 3 according to an implementation that uses only two of the SPI-4.2 status signals: "can accept data" and "cannot accept data".

FIG. 4 shows a state diagram for MAC 306 of FIG. 3 according to an implementation that uses only two of the SPI-4.2 status signals: "can accept data" and "cannot accept data". LLD 304 sends the status signals periodically to MAC 306. In this implementation, when LLD 304 asserts a "can accept data" status signal, MAC 306 sends data to LLD 304, and when LLD 304 asserts a "cannot accept data" status signal, MAC 306 sends no data to LLD 304.

In one such implementation, MAC RxFIFO 308 has two predetermined thresholds Xon and Xoff, where Xoff >Xon. Implementations using more or fewer MAC RxFIFO thresholds will be apparent to one skilled in the relevant arts after reading this description. According to this implementation, communication system 300 has four states 402, 404, 406 and 408.

MAC 306 begins in "START" state 402 on waking up (that is, after receiving power, being reset, or the like). In state 402, MAC 306 takes no action. Either of two conditions causes MAC 306 to transition to state 404: MAC 306 receives a "cannot accept data" status signal from LLD 304 or the amount X of data in the MAC's buffer 308 is equal to or greater than threshold Xoff (X>=Xoff).

In state 404, MAC 306 stops sending data to LLD 304, and begins to periodically send "pause" frames to network device 302, thereby causing network device 302 to cease sending data to MAC 306. In one implementation, the pause frames are Ethernet PAUSE frames.

MAC 306 remains in state 404 as long as MAC 306 receives no "can accept data" status signal from LLD 304. But if LLD RxFIFO 316 drains so rapidly that the amount of data in LLD RxFIFO 316 falls below the "almost full" threshold, LLD 304 asserts a "can accept data" status signal. When the amount of data X in MAC RxFIFO 308 is less than the Xon threshold (X<Xon), and MAC 306 receives a "can accept data" status signal from LLD 304, MAC 306 transitions to state 408, described in detail below. When the amount of data X in MAC RxFIFO 308 is greater than, or equal to, the Xoff threshold (X>=Xoff), and MAC 306 receives a "can accept data" status signal from LLD 304, MAC 306 transitions to state 406.

In state 406, MAC 306 continues sending periodic "pause" frames to network device 302, and begins sending data to LLD 304. LLD 304 stores the data in LLD RxFIFO 316. If the level of data in LLD RxFIFO 316 exceeds the "almost full" threshold, LLD 304 asserts a "cannot accept data" status signal. When in state 406 MAC 306 receives a "cannot accept data" status signal, MAC 306 transitions to state 404.

However, if LLD RxFIFO 316 drains so rapidly that the amount of data in LLD RxFIFO 316 falls below the "almost empty" threshold, LLD 304 asserts a "can accept data" status signal. But as long as the amount of data X in MAC RxFIFO 308 remains greater than, or equal to, the Xon threshold (and MAC 306 does not receive a "cannot accept data" status signal) MAC 306 remains in state 406. However, when the amount of data X in MAC RxFIFO 308 is below the Xon threshold (X<Xon), and MAC 306 receives a "can accept data" status signal from LLD 304, MAC 306 transitions to state 408.

In state 408, MAC 306 stops sending "pause" frames to network device 302, and sends a "resume" frame to network device 302, thereby permitting network device 302 to resume sending frames of data to network device 303. In one implementation, MAC 306 sends a resume control signal by sending an Ethernet PAUSE frame with a timer value of zero. When state 408 is immediately preceded by state 404, MAC 306 begins sending data to LLD 304. When state 408 is immediately preceded by state 406, MAC 306 continues sending data to LLD 304. MAC 306 then transitions to start state 402.

From this description of the state diagram of FIG. 4, it will be apparent that the control signals asserted by MAC 306 are based not only upon the amount of data stored in buffer 308, but also upon the amount of data stored in LLD 304. In this way MAC 306 effectively "borrows" memory from LLD 304, thus making the effective size of MAC RxFIFO 308 the sum of the size of the entire MAC RxFIFO and the size of the LLD RxFIFO above the "almost full" threshold. Thus the amount of memory in MAC 306 can be reduced compared to conventional devices where the control signals are based solely upon the amount of data in MAC RxFIFO 308. The MAC disclosed herein is thus suitable for long-distance links, and inexpensive enough for use in short-distance links. In addition, no change is required to LLDs or to the interface between the MAC and the LLD, such as the interface specified in SPI-4.2.

Figure 5:
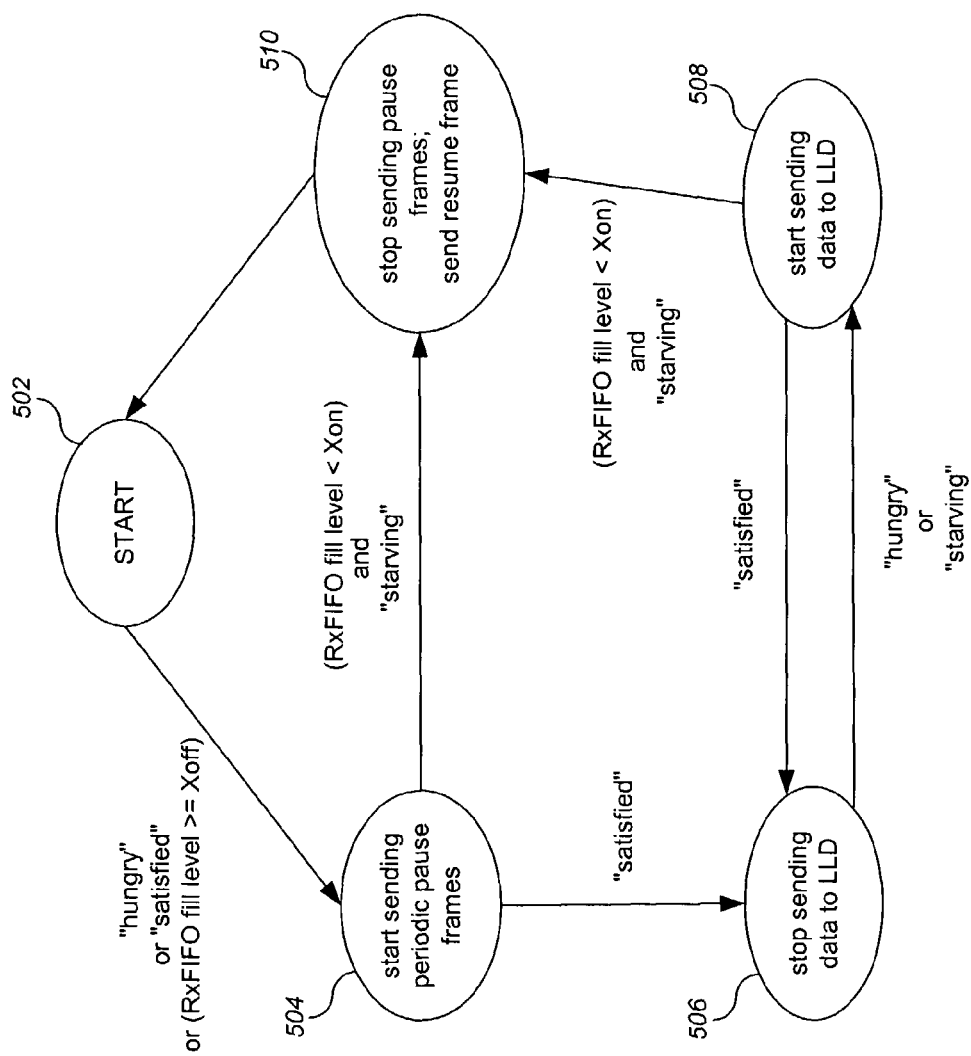
FIG. 5 shows a state diagram for FIG. 3 according to an implementation that uses all three SPI-4.2 status signals ("satisfied", "hungry" and "starving").

FIG. 5 shows a state diagram for MAC 306 of FIG. 3 according to an implementation that uses all three SPI-4.2 status signals ("satisfied", "hungry" and "starving"). LLD 304 sends the status signals periodically to MAC 306. In this implementation, when LLD 304 asserts a "starving" status signal, MAC 306 sends data to LLD 304 at a high data rate; when LLD 304 asserts a "hungry" status signal, MAC 306 sends data to LLD 304 at a low data rate; and when LLD 304 asserts a "satisfied" status signal, MAC 306 sends no data to LLD 304. In some implementations, MAC 306 sends data at a high data rate by sending no more than a predetermined amount of data MaxBurst1 until the next status update (that is, when LLD 304 next asserts a status signal), and sends data at a low data rate by sending no more than a predetermined amount of data MaxBurst2 until the next status update, where MaxBurst1 is greater than, or equal to, MaxBurst2. Methods for selecting MaxBurst1 and MaxBurst2 are discussed in the SPI-4.2 document.

In one such implementation, MAC RxFIFO has two predetermined thresholds Xon and Xoff, where Xoff>Xon. Implementations using more or fewer MAC RxFIFO thresholds will be apparent to one skilled in the relevant arts after reading this description. According to this implementation, communication system 300 has five states 502, 504, 506, 508 and 510.

MAC 306 begins in "START" state 502 on waking up (that is, after receiving power, being reset, or the like). In state 502, MAC 306 takes no action. Any of three conditions causes MAC 306 to transition to state 504: MAC 306 receives a "hungry" status signal from LLD 304, MAC 306 receives a "satisfied" status signal from LLD 304, or the amount X of data in the MAC's buffer 308 is equal to or greater than threshold Xoff (X>=Xoff).

In state 504, MAC 306 begins to periodically send "pause" frames to network device 302, thereby causing network device 302 to cease sending data to MAC 306. In some implementations, the "pause" frames are Ethernet PAUSE frames.

If LLD RxFIFO 316 drains so rapidly that the amount of data in LLD RxFIFO 316 falls below the "almost empty" threshold, LLD 304 asserts a "starving" status signal. But as long as the amount of data X in MAC RxFIFO 308 remains greater than, or equal to, the Xon threshold, and MAC 306 does not receive a "satisfied" status signal from LLD 304, MAC 306 remains in state 504. However, when the amount of data X in MAC RxFIFO 308 is below the Xon threshold (X<Xon), and MAC 306 receives a "starving" status signal from LLD 304, MAC 306 transitions to state 510, described in detail below.

Alternatively, if in state 504 MAC 306 receives further "hungry" status signals from LLD 304, MAC 306 remains in state 504. But if in state 504 MAC 306 receives a "satisfied" status signal from LLD 304, MAC 306 transitions to state 506.

In state 506, MAC 306 continues sending periodic "pause" frames to network device 302, and stops sending data to LLD 304. If in state 506 MAC 306 receives further "satisfied" status signals from LLD 304, MAC 306 remains in state 506. But if in state 506 MAC 306 receives a "hungry" or "starving" status signal from LLD 304, MAC 306 transitions to state 508.

In state 508, MAC 306 continues sending periodic "pause" frames to network device 302, and begins sending data to LLD 304 at a rate determined by the status signals received from LLD 304. LLD 304 stores the data in LLD RxFIFO 316. If the level of data in LLD RxFIFO 316 exceeds the "almost full" threshold, LLD 304 asserts a "satisfied" status signal. When in state 508 MAC 306 receives a "satisfied" status signal, MAC 306 transitions to state 506.

If LLD RxFIFO 316 drains so rapidly that the amount of data in LLD RxFIFO 316 falls below the "almost empty" threshold, LLD 304 asserts a "starving" status signal. But as long as the amount of data X in MAC RxFIFO 308 remains greater than, or equal to, the Xon threshold, MAC 306 remains in state 508. However, when the amount of data X in MAC RxFIFO 308 is below the Xon threshold (X<Xon), and MAC 306 receives a "starving" status signal from LLD 304, MAC 306 transitions to state 510.

In state 510, MAC 306 stops sending "pause" frames to network device 302, and sends a "resume" frame to network device 302, thereby permitting network device 302 to resume sending frames of data to network device 303. MAC 306 then transitions to start state 502.

From this description of the state diagram of FIG. 5, it will be apparent that the control signals asserted by MAC 306 are based not only upon the amount of data stored in buffer 308, but also upon the amount of data stored in LLD 304. In this way MAC 306 effectively "borrows" memory from LLD 304, thus making the effective size of MAC RxFIFO 308 the sum of the size of the entire MAC RxFIFO and the size of the LLD RxFIFO above the "almost full" threshold. Thus the amount of memory in MAC 306 can be reduced compared to conventional devices where the control signals are based solely upon the amount of data in MAC RxFIFO 308. The MAC disclosed herein is thus suitable for long-distance links, and inexpensive enough for use in short-distance links. In addition, no change is required to LLDs or to the interface between the MAC and the LLD, such as the interface specified in SPI-4.2.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. For example, the techniques disclosed herein are not limited to the interface between a MAC and a LLD, or to the SPI-4.2 interface, but apply equally well to other network interfaces, such as the emerging SPI-5 and FlexBus-4 interfaces, and to interfaces between other devices, such as the SPI-4.2 interfaces that exist between network processors and classification engines. Accordingly, other implementations are within the scope of the following claims.

What is claimed is:

1. A network device comprising:
   a media access controller comprising
      a first buffer to store data received from a further network device, and
      a transmitter to transmit the data from the first buffer; and
   a link-layer device to receive the data transmitted by the media access controller, the link-layer device comprising a second buffer to store the data received from the media access controller;
   wherein the link-layer device asserts status signals indicating an amount of the data in the second buffer;
   wherein the transmitter transmits the data from the first buffer to the link-layer device in response to the status signals asserted by the link-layer device; and
   wherein the media access controller further comprises a controller to send flow-control signals to the further network device based on the status signals asserted by the link-layer device, thereby causing the further network device to regulate the amount of the data sent from the further network device to the network device in response to the flow-control signals.

2. The network device of claim 1, wherein the controller sends the flow-control signals to the further network device based on the status signals asserted by the link-layer device and an amount of the data in the first buffer.

3. The network device of claim 2, wherein the controller sends a pause flow-control signal to the further network device when the status signals asserted by the link-layer device indicate that the amount of the data in the second buffer is greater than a first predetermined threshold, thereby causing the further network device to stop sending the data to the network device.

4. The network device of claim 3, wherein the controller sends a pause flow-control signal to the further network device when the amount of the data in the first buffer is greater than, or equal to, a second predetermined threshold, thereby causing the further network device to stop sending the data to the network device.

5. The network device of claim 4, wherein the controller sends a resume flow-control signal when the amount of the data in the first buffer is less than a third predetermined threshold and the status signals asserted by the link-layer device indicate that the amount of the data in the second buffer is less than the first predetermined threshold, thereby causing the further network device to resume sending the data to the network device.

6. The network device of claim 5, wherein the transmitter stops sending the data to the link-layer device when the status signals asserted by the link-layer device indicate that the amount of the data in the second buffer is greater than a fourth predetermined threshold.

7. The network device of claim 6, wherein the first predetermined threshold is less than the fourth predetermined threshold.

8. The network device of claim 7, wherein the transmitter, after stopping sending the data to the link-layer device, starts sending the data to the link-layer device when the status signals asserted by the link-layer device indicate that the amount of the data in the second buffer is less than the fourth predetermined threshold.

9. The network device of claim 8, wherein the transmitter, after starting sending the data to the link-layer device, stops sending the data to the link-layer device when the status signals asserted by the link-layer device indicate that the amount of the data in the second buffer is greater than the fourth predetermined threshold.

10. The network device of claim 6, wherein the first and fourth predetermined thresholds are the same.

11. The network device of claim 10, wherein the transmitter, after stopping sending the data to the link-layer device, starts sending the data to the link-layer device when the amount of the data in the first buffer is greater than, or equal to, the second predetermined threshold and the status signals asserted by the link-layer device indicate that the amount of the data in the second buffer is less than the first predetermined threshold.

12. The network device of claim 11, wherein the transmitter, after starting sending the data to the link-layer device, stops sending the data to the link-layer device when the status signals asserted by the link-layer device indicate that the amount of the data in the second buffer is greater than the first predetermined threshold.

13. The network device of claim 1, wherein the status signals asserted by the link layer device conform to the SPI-4.2 standard.

14. Computer-readable media embodying instructions executable by a computer to perform a method comprising:
    storing in a first buffer data received from a network device;
    sending the data from the first buffer to a second buffer in response to status signals asserted by the second buffer, wherein the second buffer stores the data, and wherein the status signals asserted by the second buffer indicate an amount of the data in the second buffer; and
    sending flow-control signals to the network device based on the status signals asserted by the second buffer, thereby causing the network device to regulate the amount of the data sent from the network device in response to the flow-control signals.

15. The media of claim 14, wherein sending the flow-control signals to the network device comprises:
    sending the flow-control signals to the network device based on the status signals asserted by the second buffer and an amount of the data in the first buffer.

16. The media of claim 15, wherein sending the flow-control signals to the network device comprises:
    sending a pause flow-control signal to the network device when the status signals asserted by the second buffer indicate that the amount of the data in the second buffer is greater than a first predetermined threshold, thereby causing the network device to stop sending the data.

17. The media of claim 16, wherein sending the flow-control signals to the network device comprises:
    sending a pause flow-control signal to the network device when the amount of the data in the first buffer is greater than, or equal to, a second predetermined threshold, thereby causing the network device to stop sending the data.

18. The media of claim 17, wherein sending the flow-control signals to the network device comprises:
    sending a resume flow-control signal when the amount of the data in the first buffer is less than a third predetermined threshold and the status signals asserted by the second buffer indicate that the amount of the data in the second buffer is less than the first predetermined threshold, thereby causing the network device to resume sending the data.

19. The media of claim 18, wherein the method further comprises:

stopping sending the data to the second buffer when the status signals asserted by the second buffer indicate that the amount of the data in the second buffer is greater than a fourth predetermined threshold.

20. The media of claim 19, wherein the first predetermined threshold is less than the fourth predetermined threshold.

21. The media of claim 20, wherein the method further comprises:
after stopping sending the data to the second buffer, starting sending the data to the second buffer when the status signals asserted by the second buffer indicate that the amount of the data in the second buffer is less than the fourth predetermined threshold.

22. The media of claim 21, wherein the method further comprises:
after starting sending the data to the second buffer, stopping sending the data to the second buffer when the status signals asserted by the second buffer indicate that the amount of the data in the second buffer is greater than the fourth predetermined threshold.

23. The media of claim 19, wherein the first and fourth predetermined thresholds are the same.

24. The media of claim 23, wherein the method further comprises:
after stopping sending the data to the second buffer, starting sending the data to the second buffer when the amount of the data in the first buffer is greater than, or equal to, the second predetermined threshold and the status signals asserted by the second buffer indicate that the amount of the data in the second buffer is less than the first predetermined threshold.

25. The media of claim 24, wherein the method further comprises:
after starting sending the data to the second buffer, stopping sending the data to the second buffer when the status signals asserted by the second buffer indicate that the amount of the data in the second buffer is greater than the first predetermined threshold.

26. The media of claim 14, wherein the status signals asserted by the second buffer conform to the SPI-4.2 standard.

27. A method comprising:
storing in a first buffer data received from a network device;
sending the data from the first buffer to a second buffer in response to status signals asserted by the second buffer, wherein the second buffer stores the data, and wherein the status signals asserted by the second buffer indicate an amount of the data in the second buffer; and
sending flow-control signals to the network device based on the status signals asserted by the second buffer, thereby causing the network device to regulate the amount of the data sent from the network device in response to the flow-control signals.

28. The method of claim 27, wherein sending the flow-control signals to the network device comprises:
sending the flow-control signals to the network device based on the status signals asserted by the second buffer and an amount of the data in the first buffer.

29. The method of claim 28, wherein sending the flow-control signals to the network device comprises:
sending a pause flow-control signal to the network device when the status signals asserted by the second buffer indicate that the amount of the data in the second buffer is greater than a first predetermined threshold, thereby causing the network device to stop sending the data.

30. The method of claim 29, wherein sending the flow-control signals to the network device comprises:
sending a pause flow-control signal to the network device when the amount of the data in the first buffer is greater than, or equal to, a second predetermined threshold, thereby causing the network device to stop sending the data.

31. The method of claim 30, wherein sending the flow-control signals to the network device comprises:
sending a resume flow-control signal when the amount of the data in the first buffer is less than a third predetermined threshold and the status signals asserted by the second buffer indicate that the amount of the data in the second buffer is less than the first predetermined threshold, thereby causing the network device to resume sending the data.

32. The method of claim 31, further comprising:
stopping sending the data to the second buffer when the status signals asserted by the second buffer indicate that the amount of the data in the second buffer is greater than a fourth predetermined threshold.

33. The method of claim 32, wherein the first predetermined threshold is less than the fourth predetermined threshold.

34. The method of claim 33, further comprising:
after stopping sending the data to the second buffer, starting sending the data to the second buffer when the status signals asserted by the second buffer indicate that the amount of the data in the second buffer is less than the fourth predetermined threshold.

35. The method of claim 34, further comprising:
after starting sending the data to the second buffer, stopping sending the data to the second buffer when the status signals asserted by the second buffer indicate that the amount of the data in the second buffer is greater than the fourth predetermined threshold.

36. The method of claim 32, wherein the first and fourth predetermined thresholds are the same.

37. The method of claim 36, further comprising:
after stopping sending the data to the second buffer, starting sending the data to the second buffer when the amount of the data in the first buffer is greater than, or equal to, the second predetermined threshold and the status signals asserted by the second buffer indicate that the amount of the data in the second buffer is less than the first predetermined threshold.

38. The method of claim 37, further comprising:
after starting sending the data to the second buffer, stopping sending the data to the second buffer when the status signals asserted by the second buffer indicate that the amount of the data in the second buffer is greater than the first predetermined threshold.

39. The method of claim 27, wherein the status signals asserted by the second buffer conform to the SPI-4.2 standard.

40. A network comprising:
a first network device to transmit data; and
a second network device to receive the data, the second network device comprising
a media access controller comprising
a first buffer to store the data received from the first network device, and
a transmitter to transmit the data from the first buffer, and
a link-layer device to receive the data transmitted by the media access controller, the link-layer device comprising a second buffer to store the data received from the media access controller;

wherein the link-layer device asserts status signals indicating an amount of the data in the second buffer;

wherein the transmitter transmits the data from the first buffer to the link-layer device in response to the status signals asserted by the link-layer device; and wherein the media access controller further comprises a controller to send flow-control signals to the first network device based on the status signals asserted by the link-layer device, thereby causing the first network device to regulate the amount of the data sent from the first network device to the second network device in response to the flow-control signals.

41. The network of claim 40, wherein the controller sends the flow-control signals to the first network device based on the status signals asserted by the link-layer device and an amount of the data in the first buffer.

42. The network of claim 41, wherein the controller sends a pause flow-control signal to the first network device when the status signals asserted by the link-layer device indicate that the amount of the data in the second buffer is greater than a first predetermined threshold, thereby causing the first network device to stop sending the data to the second network device.

43. The network of claim 42, wherein the controller sends a pause flow-control signal to the first network device when the amount of the data in the first buffer is greater than, or equal to, a second predetermined threshold, thereby causing the first network device to stop sending the data to the second network device.

44. The network of claim 43, wherein the controller sends a resume flow-control signal when the amount of the data in the first buffer is less than a third predetermined threshold and the status signals asserted by the link-layer device indicate that the amount of the data in the second buffer is less than the first predetermined threshold, thereby causing the first network device to resume sending the data to the second network device.

45. The network of claim 44, wherein the transmitter stops sending the data to the link-layer device when the status signals asserted by the link-layer device indicate that the amount of the data in the second buffer is greater than a fourth predetermined threshold.

46. The network of claim 45, wherein the first predetermined threshold is less than the fourth predetermined threshold.

47. The network of claim 46, wherein the transmitter, after stopping sending the data to the link-layer device, starts sending the data to the link-layer device when the status signals asserted by the link-layer device indicate that the amount of the data in the second buffer is less than the fourth predetermined threshold.

48. The network of claim 47, wherein the transmitter, after starting sending the data to the link-layer device, stops sending the data to the link-layer device when the status signals asserted by the link-layer device indicate that the amount of the data in the second buffer is greater than the fourth predetermined threshold.

49. The network of claim 45, wherein the first and fourth predetermined thresholds are the same.

50. The network of claim 49, wherein the transmitter, after stopping sending the data to the link-layer device, starts sending the data to the link-layer device when the amount of the data in the first buffer is greater than, or equal to, the second predetermined threshold and the status signals asserted by the link-layer device indicate that the amount of the data in the second buffer is less than the first predetermined threshold.

51. The network of claim 50, wherein the transmitter, after starting sending the data to the link-layer device, stops sending the data to the link-layer device when the status signals asserted by the link-layer device indicate that the amount of the data in the second buffer is greater than the first predetermined threshold.

52. The network of claim 40, wherein the status signals asserted by the link-layer device conform to the SPI-4.2 standard.

53. Computer-readable media embodying instructions executable by a computer to perform a method comprising:
transmitting data from a first network device;
receiving the data at a second network device;
storing the data in a first buffer in the second network device;
sending the data from the first buffer to a second buffer in the second network device in response to status signals asserted by the second buffer, wherein the second buffer stores the data, and wherein the status signals asserted by the second buffer indicate an amount of the data in the second buffer; and
sending flow-control signals to the first network device based on the status signals asserted by the second buffer, thereby causing the first network device to regulate the amount of the data sent from the first network device to the second network device in response to the flow-control signals.

54. The media of claim 53, wherein sending the flow-control signals to the first network device comprises:
sending the flow-control signals to the first network device based on the status signals asserted by the second buffer and an amount of the data in the first buffer.

55. The media of claim 54, wherein sending the flow-control signals to the first network device comprises:
sending a pause flow-control signal to the first network device when the status signals asserted by the second buffer indicate that the amount of the data in the second buffer is greater than a first predetermined threshold, thereby causing the first network device to stop sending the data.

56. The media of claim 55, wherein sending the flow-control signals to the first network device comprises:
sending a pause flow-control signal to the first network device when the amount of the data in the first buffer is greater than, or equal to, a second predetermined threshold, thereby causing the first network device to stop sending the data.

57. The media of claim 56, wherein sending the flow-control signals to the first network device comprises:
sending a resume flow-control signal when the amount of the data in the first buffer is less than a third predetermined threshold and the status signals asserted by the second buffer indicate that the amount of the data in the second buffer is less than the first predetermined threshold, thereby causing the first network device to resume sending the data.

58. The media of claim 57, wherein the method further comprises:
stopping sending the data to the second buffer when the status signals asserted by the second buffer indicate that the amount of the data in the second buffer is greater than a fourth predetermined threshold.

59. The media of claim 58, wherein the first predetermined threshold is less than the fourth predetermined threshold.

60. The media of claim 59, wherein the method further comprises:

after stopping sending the data to the second buffer, starting sending the data to the second buffer when the status signals asserted by the second buffer indicate that the amount of the data in the second buffer is less than the fourth predetermined threshold.

61. The media of claim 60, wherein the method further comprises:
after starting sending the data to the second buffer, stopping sending the data to the second buffer when the status signals asserted by the second buffer indicate that the amount of the data in the second buffer is greater than the fourth predetermined threshold.

62. The media of claim 58, wherein the first and fourth predetermined thresholds are the same.

63. The media of claim 62, wherein the method further comprises:
after stopping sending the data to the second buffer, starting sending the data to the second buffer when the amount of the data in the first buffer is greater than, or equal to, the second predetermined threshold and the status signals asserted by the second buffer indicate that the amount of the data in the second buffer is less than the first predetermined threshold.

64. The media of claim 63, wherein the method further comprises:
after starting sending the data to the second buffer, stopping sending the data to the second buffer when the status signals asserted by the second buffer indicate that the amount of the data in the second buffer is greater than the first predetermined threshold.

65. The media of claim 53, wherein the status signals asserted by the second buffer conform to the SPI-4.2 standard.

66. A method comprising:
transmitting data from a first network device;
receiving the data at a second network device;
storing the data in a first buffer in the second network device;
sending the data from the first buffer to a second buffer in the second network device in response to status signals asserted by the second buffer, wherein the second buffer stores the data, and wherein the status signals asserted by the second buffer indicate an amount of the data in the second buffer; and
sending flow-control signals to the first network device based on the status signals asserted by the second buffer, thereby causing the first network device to regulate the amount of the data sent from the first network device to the second network device in response to the flow-control signals.

67. The method of claim 66, wherein sending the flow-control signals to the first network device comprises:
sending the flow-control signals to the first network device based on the status signals asserted by the second buffer and an amount of the data in the first buffer.

68. The method of claim 67, wherein sending the flow-control signals to the first network device comprises:
sending a pause flow-control signal to the first network device when the status signals asserted by the second buffer indicate that the amount of the data in the second buffer is greater than a first predetermined threshold, thereby causing the first network device to stop sending the data.

69. The method of claim 68, wherein sending the flow-control signals to the first network device comprises:
sending a pause flow-control signal to the first network device when the amount of the data in the first buffer is greater than, or equal to, a second predetermined threshold, thereby causing the first network device to stop sending the data.

70. The method of claim 69, wherein sending the flow-control signals to the first network device comprises:
sending a resume flow-control signal when the amount of the data in the first buffer is less than a third predetermined threshold and the status signals asserted by the second buffer indicate that the amount of the data in the second buffer is less than the first predetermined threshold, thereby causing the first network device to resume sending the data.

71. The method of claim 70, further comprising:
stopping sending the data to the second buffer when the status signals asserted by the second buffer indicate that the amount of the data in the second buffer is greater than a fourth predetermined threshold.

72. The method of claim 71, wherein the first predetermined threshold is less than the fourth predetermined threshold.

73. The method of claim 72, further comprising:
after stopping sending the data to the second buffer, starting sending the data to the second buffer when the status signals asserted by the second buffer indicate that the amount of the data in the second buffer is less than the fourth predetermined threshold.

74. The method of claim 73, further comprising:
after starting sending the data to the second buffer, stopping sending the data to the second buffer when the status signals asserted by the second buffer indicate that the amount of the data in the second buffer is greater than the fourth predetermined threshold.

75. The method of claim 71, wherein the first and fourth predetermined thresholds are the same.

76. The method of claim 75, further comprising:
after stopping sending the data to the second buffer, starting sending the data to the second buffer when the amount of the data in the first buffer is greater than, or equal to, the second predetermined threshold and the status signals asserted by the second buffer indicate that the amount of the data in the second buffer is less than the first predetermined threshold.

77. The method of claim 76, further comprising:
after starting sending the data to the second buffer, stopping sending the data to the second buffer when the status signals asserted by the second buffer indicate that the amount of the data in the second buffer is greater than the first predetermined threshold.

78. The method of claim 66, wherein the status signals asserted by the second buffer conform to the SPI-4.2 standard.

79. An apparatus for communicating data from a first communication device to a second communication device, comprising:
a first buffer to store the data received from the first communication device;
a transmitter to send the data from the first buffer to the second communication device in response to status signals asserted by the second communication device, wherein the second communication device stores the data in a second buffer, and wherein the status signals asserted by the second communication device indicate an amount of the data in the second buffer; and
a controller to send flow-control signals to the first communication device based on the status signals asserted by the second communication device, thereby causing the first communication device to regulate the amount of the data sent from the first communication device to the second communication device in response to the flow-control signals.

80. The apparatus of claim 79, wherein the controller sends the flow-control signals to the first communication device based on the status signals asserted by the second communication device and an amount of the data in the first buffer.

81. The apparatus of claim 80, wherein the controller sends a pause flow-control signal to the first communication device when the status signals asserted by the second communication device indicate that the amount of the data in the second buffer is greater than a first predetermined threshold, thereby causing the first communication device to stop sending the data to the second communication device.

82. The apparatus of claim 81, wherein the controller sends a pause flow-control signal to the first communication device when the amount of the data in the first buffer is greater than, or equal to, a second predetermined threshold, thereby causing the first communication device to stop sending the data to the second communication device.

83. The apparatus of claim 82, wherein the controller sends a resume flow-control signal when the amount of the data in the first buffer is less than a third predetermined threshold and the status signals asserted by the second communication device indicate that the amount of the data in the second buffer is less than the first predetermined threshold, thereby causing the first communication device to resume sending the data to the second communication device.

84. The apparatus of claim 83, wherein the transmitter stops sending the data to the second communication device when the status signals asserted by the second communication device indicate that the amount of the data in the second buffer is greater than a fourth predetermined threshold.

85. The apparatus of claim 84, wherein the first predetermined threshold is less than the fourth predetermined threshold.

86. The apparatus of claim 85, wherein the transmitter, after stopping sending the data to the second communication device, starts sending the data to the second communication device when the status signals asserted by the second communication device indicate that the amount of the data in the second buffer is less than the fourth predetermined threshold.

87. The apparatus of claim 86, wherein the transmitter, after starting sending the data to the second communication device, stops sending the data to the second communication device when the status signals asserted by the second communication device indicate that the amount of the data in the second buffer is greater than the fourth predetermined threshold.

88. The apparatus of claim 84, wherein the first and fourth predetermined thresholds are the same.

89. The apparatus of claim 88, wherein the transmitter, after stopping sending the data to the second communication device, starts sending the data to the second communication device when the amount of the data in the first buffer is greater than, or equal to, the second predetermined threshold and the status signals asserted by the second communication device indicate that the amount of the data in the second buffer is less than the first predetermined threshold.

90. The apparatus of claim 89, wherein the transmitter, after starting sending the data to the second communication device, stops sending the data to the second communication device when the status signals asserted by the second communication device indicate that the amount of the data in the second buffer is greater than the first predetermined threshold.

91. The apparatus of claim 79, wherein the status signals asserted by the second communication device conform to the SPI-4.2 standard.

92. An apparatus for communicating data from a first communication device to a second communication device, comprising:
    memory means for storing in a third communication device the data received from the first communication device;
    transmitter means for sending the data from the third communication device to the second communication device in response to status signals asserted by the second communication device, wherein the second communication device stores the data in a buffer, and wherein the status signals asserted by the second communication device indicate an amount of the data in the buffer; and
    controller means for sending flow-control signals to the first communication device based on the status signals asserted by the second communication device, thereby causing the first communication device to regulate the amount of the data sent from the first communication device to the second communication device in response to the flow-control signals.

93. The apparatus of claim 92, wherein the controller means sends the flow-control signals to the first communication device based on the status signals asserted by the second communication device and an amount of the data in the third communication device.

94. The apparatus of claim 93, wherein the controller means sends a pause flow-control signal to the first communication device when the status signals asserted by the second communication device indicate that the amount of the data in the buffer is greater than a first predetermined threshold, thereby causing the first communication device to stop sending the data to the second communication device.

95. The apparatus of claim 94, wherein the controller means sends a pause flow-control signal to the first communication device when the amount of the data in the third communication device is greater than, or equal to, a second predetermined threshold, thereby causing the first communication device to stop sending the data to the second communication device.

96. The apparatus of claim 95, wherein the controller means sends a resume flow-control signal when the amount of the data in the third communication device is less than a third predetermined threshold and the status signals asserted by the second communication device indicate that the amount of the data in the buffer is less than the first predetermined threshold, thereby causing the first communication device to resume sending the data to the second communication device.

97. The apparatus of claim 96, wherein the transmitter means stops sending the data to the second communication device when the status signals asserted by the second communication device indicate that the amount of the data in the buffer is greater than a fourth predetermined threshold.

98. The apparatus of claim 97, wherein the first predetermined threshold is less than the fourth predetermined threshold.

99. The apparatus of claim 98, wherein the transmitter means, after stopping sending the data to the second communication device, starts sending the data to the second communication device when the status signals asserted by the second communication device indicate that the amount of the data in the buffer is less than the fourth predetermined threshold.

100. The apparatus of claim 99, wherein the transmitter means, after starting sending the data to the second communication device, stops sending the data to the second communication device when the status signals asserted by the second communication device indicate that the amount of the data in the buffer is greater than the fourth predetermined threshold.

101. The apparatus of claim 97, wherein the first and fourth predetermined thresholds are the same.

102. The apparatus of claim 101, wherein the transmitter means, after stopping sending the data to the second communication device, starts sending the data to the second communication device when the amount of the data in the third communication device is greater than, or equal to, the second predetermined threshold and the status signals asserted by the second communication device indicate that the amount of the data in the buffer is less than the first predetermined threshold.

103. The apparatus of claim 102, wherein the transmitter means, after starting sending the data to the second communication device, stops sending the data to the second communication device when the status signals asserted by the second communication device indicate that the amount of the data in the buffer is greater than the first predetermined threshold.

104. The apparatus of claim 91, wherein the status signals asserted by the second communication device conform to the SPI-4.2 standard.

105. Computer-readable media embodying instructions executable by a computer to perform a method for communicating data from a first communication device to a second communication device, the method comprising:
    storing in a third communication device the data received from the first communication device;
    sending the data from the third communication device to the second communication device in response to status signals asserted by the second communication device, wherein the second communication device stores the data in a buffer, and wherein the status signals asserted by the second communication device indicate an amount of the data in the buffer; and
    sending flow-control signals to the first communication device based on the status signals asserted by the second communication device, thereby causing the first communication device to regulate the amount of the data sent from the first communication device to the second communication device in response to the flow-control signals.

106. The media of claim 105, wherein sending the flow-control signals to the first communication device comprises:
    sending the flow-control signals to the first communication device based on the status signals asserted by the second communication device and an amount of the data in the third communication device.

107. The media of claim 106, wherein sending the flow-control signals to the first communication device comprises:
    sending a pause flow-control signal to the first communication device when the status signals asserted by the second communication device indicate that the amount of the data in the buffer is greater than a first predetermined threshold, thereby causing the first communication device to stop sending the data to the second communication device.

108. The media of claim 107, wherein sending the flow-control signals to the first communication device comprises:
    sending a pause flow-control signal to the first communication device when the amount of the data in the third communication device is greater than, or equal to, a second predetermined threshold, thereby causing the first communication device to stop sending the data to the second communication device.

109. The media of claim 108, wherein sending the flow-control signals to the first communication device comprises:
    sending a resume flow-control signal when the amount of the data in the third communication device is less than a third predetermined threshold and the status signals asserted by the second communication device indicate that the amount of the data in the buffer is less than the first predetermined threshold, thereby causing the first communication device to resume sending the data to the second communication device.

110. The media of claim 109, wherein the method further comprises:
    stopping sending the data to the second communication device when the status signals asserted by the second communication device indicate that the amount of the data in the buffer is greater than a fourth predetermined threshold.

111. The media of claim 110, wherein the first predetermined threshold is less than the fourth predetermined threshold.

112. The media of claim 111, wherein the method further comprises:
    after stopping sending the data to the second communication device, starting sending the data to the second communication device when the status signals asserted by the second communication device indicate that the amount of the data in the buffer is less than the fourth predetermined threshold.

113. The media of claim 112, wherein the method further comprises:
    after starting sending the data to the second communication device, stopping sending the data to the second communication device when the status signals asserted by the second communication device indicate that the amount of the data in the buffer is greater than the fourth predetermined threshold.

114. The media of claim 110, wherein the first and fourth predetermined thresholds are the same.

115. The media of claim 114, wherein the method further comprises:
    after stopping sending the data to the second communication device, starting sending the data to the second communication device when the amount of the data in the third communication device is greater than, or equal to, the second predetermined threshold and the status signals asserted by the second communication device indicate that the amount of the data in the buffer is less than the first predetermined threshold.

116. The media of claim 115, wherein the method further comprises:
    after starting sending the data to the second communication device, stopping sending the data to the second communication device when the status signals asserted by the second communication device indicate that the amount of the data in the buffer is greater than the first predetermined threshold.

117. The media of claim 105, wherein the status signals asserted by the second communication device conform to the SPI-4.2 standard.

118. A method for communicating data from a first communication device to a second communication device, comprising:
    storing in a third communication device the data received from the first communication device;
    sending the data from the third communication device to the second communication device in response to status signals asserted by the second communication device, wherein the second communication device stores the data in a buffer, and wherein the status signals asserted by the second communication device indicate an amount of the data in the buffer; and sending flow-control signals to the first communication device based on the status signals asserted by the second communication device, thereby causing the first communication device to regulate the amount of the data sent from the first communication device to the second communication device in response to the flow-control signals.

119. The method of claim 118, wherein sending the flow-control signals to the first communication device comprises:
sending the flow-control signals to the first communication device based on the status signals asserted by the second communication device and an amount of the data in the third communication device.

120. The method of claim 119, wherein sending the flow-control signals to the first communication device comprises:
sending a pause flow-control signal to the first communication device when the status signals asserted by the second communication device indicate that the amount of the data in the buffer is greater than a first predetermined threshold, thereby causing the first communication device to stop sending the data to the second communication device.

121. The method of claim 120, wherein sending the flow-control signals to the first communication device comprises:
sending a pause flow-control signal to the first communication device when the amount of the data in the third communication device is greater than, or equal to, a second predetermined threshold, thereby causing the first communication device to stop sending the data to the second communication device.

122. The method of claim 121, wherein sending the flow-control signals to the first communication device comprises:
sending a resume flow-control signal when the amount of the data in the third communication device is less than a third predetermined threshold and the status signals asserted by the second communication device indicate that the amount of the data in the buffer is less than the first predetermined threshold, thereby causing the first communication device to resume sending the data to the second communication device.

123. The method of claim 122, further comprising:
stopping sending the data to the second communication device when the status signals asserted by the second communication device indicate that the amount of the data in the buffer is greater than a fourth predetermined threshold.

124. The method of claim 123, wherein the first predetermined threshold is less than the fourth predetermined threshold.

125. The method of claim 124, further comprising:
after stopping sending the data to the second communication device, starting sending the data to the second communication device when the status signals asserted by the second communication device indicate that the amount of the data in the buffer is less than the fourth predetermined threshold.

126. The method of claim 125, further comprising:
after starting sending the data to the second communication device, stopping sending the data to the second communication device when the status signals asserted by the second communication device indicate that the amount of the data in the buffer is greater than the fourth predetermined threshold.

127. The method of claim 123, wherein the first and fourth predetermined thresholds are the same.

128. The method of claim 127, further comprising:
after stopping sending the data to the second communication device, starting sending the data to the second communication device when the amount of the data in the third communication device is greater than, or equal to, the second predetermined threshold and the status signals asserted by the second communication device indicate that the amount of the data in the buffer is less than the first predetermined threshold.

129. The method of claim 128, further comprising:
after starting sending the data to the second communication device, stopping sending the data to the second communication device when the status signals asserted by the second communication device indicate that the amount of the data in the buffer is greater than the first predetermined threshold.

130. The method of claim 118, wherein the status signals asserted by the second communication device conform to the SPI-4.2 standard.

* * * * *